US005537858A

United States Patent [19]

Bauer

[11] Patent Number: 5,537,858

[45] Date of Patent: Jul. 23, 1996

[54] SYSTEM FOR THE NONINTRUSIVE MONITORING OF ELECTRICAL CIRCUIT BREAKER VESSEL PRESSURE

[75] Inventor: Donald L. Bauer, Atascadero, Calif.

[73] Assignee: National Technical Systems, Inc., Calabasas, Calif.

[21] Appl. No.: 245,417

[22] Filed: May 18, 1994

[51] Int. Cl.$^{6}$ .......................................................... G01L 9/00

[52] U.S. Cl. ................................ 73/49.3; 73/37.5; 73/52; 340/605; 340/626; 324/424; 324/460; 218/122

[58] Field of Search .............................. 73/705, 49.3, 52, 73/753, 49.2, 37.5, 149, 49.4, 52, 49.3, 37.5; 340/605, 626; 200/144 B, 144 R, DIG. 16; 324/408, 409, 424, 460; 218/10, 13, 84, 122

[56] References Cited

U.S. PATENT DOCUMENTS

| | | | |
|---|---|---|---|
| 3,263,162 | 7/1966 | Lucek et al. | 324/33 |
| 3,403,297 | 9/1968 | Crouch | 317/62 |
| 4,000,457 | 12/1976 | O'Neal, III | 324/33 |
| 4,117,718 | 10/1978 | Hayward | 73/52 |
| 4,402,224 | 9/1983 | Fukushima | 73/705 |
| 4,403,124 | 9/1983 | Perkins et al. | 200/144 B |
| 4,420,980 | 12/1983 | Dunemann et al. | 73/730 |
| 4,491,704 | 1/1985 | Milianowicz et al. | 200/144 B |
| 4,706,501 | 11/1987 | Atkinson et al. | 73/730 |
| 4,723,058 | 2/1988 | Mitsukuchi et al. | 200/148 F |
| 5,119,679 | 6/1992 | Frisch | 73/705 |
| 5,286,933 | 2/1994 | Pham | 200/144 B |
| 5,301,553 | 4/1994 | Schultz et al. | 73/705 |
| 5,311,779 | 5/1994 | Teruo | 73/726 |
| 5,319,978 | 6/1994 | Grudzien, Jr. | 73/705 |

*Primary Examiner*—Hezron E. Williams
*Assistant Examiner*—Richard A. Moller
*Attorney, Agent, or Firm*—Marvin H. Kleinberg; Michael J. Ram; Marshall A. Lerner

[57] ABSTRACT

A sensitive to a change in the physical dimension(s) of the exterior surface of a pressure vessel transducer and attached to the exterior surface thereof the pressure vessel may be a vacuum chamber. The transducer measures exterior dimension change, representing interior pressure change information, without intrusion. The measurements are displayed using distinctive lights or audible alarms which signal if the pressure inside the vessel is within a predetermined range. If the pressure within the vessel varies outside of the predetermined range, a more precise display device such as a meter, is provided to aid facility personnel in deciding when repairs are necessary.

12 Claims, 1 Drawing Sheet

SYSTEM FOR THE NONINTRUSIVE MONITORING OF ELECTRICAL CIRCUIT BREAKER VESSEL PRESSURE

BACKGROUND OF THE INVENTION

1. Field of the Invention

The present invention is generally related to pressure monitoring systems and specifically related to systems for nonintrusively monitoring the pressure inside circuit interrupter pressure vessels.

2. Overview of the Technical Problem

High power circuit breakers or interrupters are generally an important feature in power generating and distribution facilities. Unlike circuit breakers found in the home, modern high power circuit breakers are composed of separate current sensors, an actuator assembly and 3 current interrupters (one for each phase of current). Generally, a circuit interrupter includes a switching mechanism (driven by the actuator assembly) which is sealed in a pressure vessel such as a glass epoxy bottle with a high dielectric, noninflammable gas such as sulfur hexafluoride ($SF_6$), at 25 to 45 pounds per square inch (PSI) above the outside ambient pressure. This configuration is designed to contain and extinguish the intense arcing that is inherently present when a high power line is opened. Alternatively, the circuit interrupter switching mechanism may be housed in a vacuum container.

Unfortunately, it is impossible to insure that the seal on such a pressure vessel or bottle will remain perfectly intact. One place where a leak might develop is at the actuating shaft. This is the shaft that is used to cause the circuit interrupter to open the circuit. Also, at those places where it is necessary to run an electrical bus into the circuit interrupter, there is a leakage risk. Finally, the joints in the housing for the circuit interrupter, where one component portion meets another, are somewhat vulnerable to the development of leaks.

If too much gas leaks from the vessel, the circuit interrupter will arc violently when interrupting power to switch normal loads or respond to an excessive current fault. The tremendous heat generated by this arcing presents a grave danger to the power facility and its personnel. The same problem may occur if a vacuum bottle develops a leak which allows air into the bottle.

Because of the importance of verifying that the circuit interrupters remain in optimum working condition, they are often produced with a pressure switch or sensor already installed. Unfortunately, as these sensors directly measure the pressure inside the vessel, they require that some breach be made in the bottle to carry pressure information to the exterior of the vessel. This creates a potential leak point in the vessel.

Furthermore, most pressure switches only indicate that the interior bottle pressure is within a particular range of values. The communication from these switches is typically a simple contact closure indicating "pressure low." Although some manufacturers advise the manual manipulation of the circuit interrupter, operating shaft during periodic maintenance to further assess the level of the pressure, this yields, at best, an extremely crude measurement.

A facility operator, when advised of a "pressure low" condition in a circuit interrupter bottle, has little choice but to immediately repair the condition. This is because, although the "pressure low" indicator is generally set to signal when the pressure in the bottle is still adequate to allow switching the interrupter to its "open" state, there is no indication of how quickly the pressurized dielectric gas is leaking from the bottle. If the gas is leaking rapidly, any delay in repair could be dangerous. Should an excessive current fault occur on that circuit after the pressure has fallen to a dangerously low level, the circuit interrupter's resultant action to switch to its "open" state could result in uncontrolled arcing, producing a great deal of heat, bottle rupture and potentially a fireball.

Even if a fault does not occur when the pressure is dangerously low, the circuit interrupter will have to be switched to "open" in order to effect repairs. If the pressure has fallen sufficiently, for example, that it approximately equals the exterior ambient pressure, this switching, in itself, may cause uncontrolled arcing and the potential for fire.

The safe choice of repairing the condition immediately may, however, prove extremely expensive. Some power facility circuit interrupters control power lines that supply power to essential portions of the facility. Therefore, to service one of these circuit interrupters, the entire facility may be forced to shut down. In the case of a nuclear plant, the cost can exceed several million dollars. Even if the circuit interrupter is not on a crucial line, the repair would preferably be done on a non-emergency basis, and should be scheduled for a time when a low power demand is expected and other maintenance operations are planned.

If a facility manager can be told that the pressure in the vessel is falling very slowly, he has the option of delaying the repair until the next scheduled facility downtime. For example, this occurs every 18 months in a nuclear plant to allow the fuel to be restocked. Alternatively, he could schedule the repairs for a traditionally low power demand time period such as a Sunday night. Slow leaks are generally more common than fast leaks. Some leaks stop spontaneously as the pressure in the bottle drops below the level necessary to force out more gas.

Some circuit interrupter manufacturers advise, especially for the vacuum housed interrupters, that periodic maintenance testing be performed routinely in lieu of gauging the interior pressure of the circuit interrupter. Unfortunately, in a power facility, where the failure of a circuit interrupter could be disastrous, even the possibility that a vessel has become depressurized or has had its vacuum broken is unacceptable.

What is needed is a system for monitoring the pressure of a circuit interrupter pressure vessel without breaching the vessel to acquire the information and with sufficient precision so that repair or replacement may be scheduled to take place at a convenient time, when it is safe to do so.

3. Review of the Prior Art

A dimension sensitive transducer is a device which changes some detectable physical characteristic in response to change in a predetermined dimension of a monitored object. Strain gauges are among the most well known, widely available devices of this type. A strain gauge typically consists of a supporting substrate and a resistive element such as an elastic wire with two terminals. As the surface to which the gauge is attached changes in size along the strain gauge measurement axis, the wire geometry is changed accordingly, producing a change in electrical resistance. This change in resistance is measured to determine the change in the item's dimensions along the measurement axis.

Strain gauges are typically about an inch square with electrical resistance varying in proportion to strain about a central point that is typically in the hundreds of ohms. They can be sensitive to changes in the surface length along the measurement axis on the order of micro inches. Although there is some precedent for using electrical transducers to assess the change in volume inside a cylinder, there has been no suggestion that such a device should be used to measure the pressure inside a vessel such as a glass epoxy bottle which is used to maintain circuit interrupters in a high pressure inert gas environment or, alternatively, in a ceramic vacuum chamber.

U.S. Pat. No. 4,420,980, issued to Duneman et al., describes a method for measuring the pressure inside of a cylindrical cavity by the cooperative placement and coordination of electrical transducers to measure and compare the longitudinal and the circumferential distortion of the shape of the container. This method is intended to measure the distortions related to the interior pressure changes in diesel fuel lines and to be insensitive to other distortions which are independent of fluid pressure.

The patent granted to Atkinson et al., U.S. Pat. No. 4,706,501, teaches a method for examining the changes in pressure over time to determine when there has been a sudden, unreversed drop in pressure in a pipeline to signal the occurrence of a puncture or rupture in the line.

U.S. Pat. No. 4,117,718, granted to Hayward, teaches a method for determining whether or not the contents of a container are under the correct pressure by measuring the deflection of a flexible wall of the container at a number of closely spaced points. This method is for use with food or other containers which can be supplied with a flexible wall in monitoring.

The patent granted to Mitsukuchi et al., U.S. Pat. No. 4,723,058, describes a circuit interrupter which is mechanically disabled when a drop in the gas pressure in an enclosed volume reaches a predetermined level. The "inoperable" condition is signalled and displayed. There is no advance warning, however, as this device is either "on" or "off." Further, by making the switch inoperable, a small explosion may be prevented at the switch by risking more catastrophic events elsewhere in the system.

U.S. Pat. No. 3,263,162, granted to Lucek et al., U.S. Pat. No. 3,403,297, granted to D. W. Crouch and U.S. Pat. No. 4,403,124, granted to Perkins et al. use ion detectors to detect the presence of air molecules in what should be a vacuum. None are readily applicable to noninvasively signal pressure loss in a pressurized bottle used to isolate modern day circuit interrupters.

U.S. Pat. No. 4,000,457, granted to O'Neal III, teaches a pressure measurement device that also works with an ion detector. In this reference, however, the potential difference between anode and cathode is varied to provide for pressure measurements over a wider range of low pressure and is not directed to the problem of non-invasive pressure measurement.

Further, ionization type leak detectors that signal the presence of $SF_6$ may signal a current leak rate, but do not report when the leak began, how long it lasted and whether the internal pressure is adequate to withstand a circuit interruption.

SUMMARY OF THE INVENTION

The present invention includes a system and a method in which the pressure inside a circuit interrupter pressure vessel is monitored by means of a dimension sensitive transducer. Typically this would take the form of a strain gauge affixed to the exterior of the vessel. Changing pressure within the vessel causes the vessel wall exterior to expand or contract, proportionally. The strain gauge is sensitive to these microscopic dimensional changes and, when calibrated accordingly, can accurately convey bottle interior pressure information.

There are a number of other dimension sensitive transducers which may be valuable in assessing the change in pressure inside a pressure vessel or bottle. At this point in the research and investigation of the system a complete census of such devices has not been made. Two types of devices which seem promising, however, are fiber optic dimension sensing devices and laser measurement devices. These optically based devices have the advantage of being less susceptible than strain gauges to the high power electromagnetic waves which are generally present inside a power facility and can provide electrical isolation for personnel and electronic equipment safety where necessary.

With the preferred method of the present invention, pressure "good" and pressure "low" indicator lights and/or audible alarms are used. When a pressure "low" condition is indicated, a precision display can be attached to the terminal of the signal conditioning electronics which represents the dimension sensitive transducer which has been bonded to the exterior of the pressure vessel. This provides operating personnel with detailed information which may either necessitate prompt repairs or permit repairs to be scheduled for a later, more convenient date.

The pressure might, for instance, register a "low" pressure condition which is still sufficiently high to permit the circuit interrupter to continue in safe operation. In such a situation, the precision display which could be monitored periodically to see when repairs actually become necessary. If the low pressure condition has been caused by a slow leak, it is likely that the leak could spontaneously stop at some low but safe pressure. In this event, repairs could be postponed until a scheduled facility shut down.

In any event a leak could be detected and repairs scheduled for the next regular shutdown unless the leak was such as to mandate an immediate shutdown for repair and repressurization.

The novel features which are characteristic of the invention, both as to the system and the method of operation, together with further advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

DETAILED DESCRIPTION OF THE PREFERRED EMBODIMENT

Figure 1:
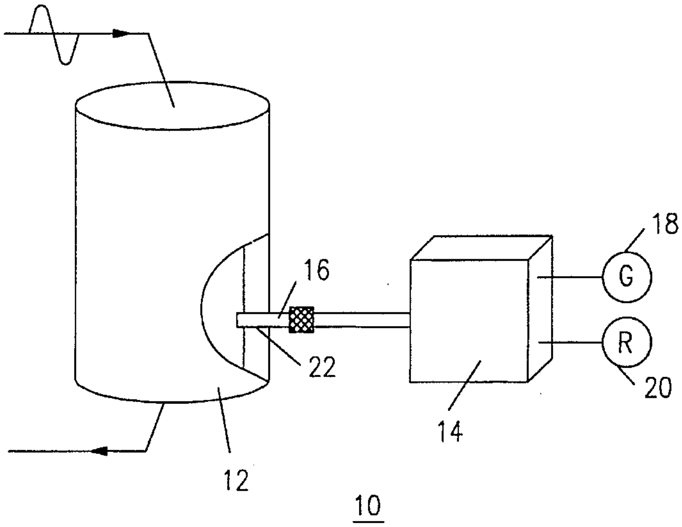
FIG. 1 PRIOR ART
FIG. 1 is a diagram of a prior art system for monitoring pressure inside a circuit interrupter pressure vessel.

FIG. 1 is a diagram of a prior art system 10 for monitoring pressure inside a circuit interrupter pressure vessel or bottle 12. Pressure transducer/sensor 14 is connected to the interior of the pressure vessel through a connector 16. So long as transducer 14 senses adequate pressure, a first or green light 18 is illuminated. When a predetermined low pressure level is detected, a second or red light 20 is illuminated.

Unfortunately, in this prior art system, the aperture 22 through which connection is made to the transducer 14 is a potential "leak point" in the system. Furthermore, the two signal lights 18, 20 provide the monitoring personnel with information at a frustratingly low level of precision. If the red light 20 is illuminated on a circuit interrupter which supplies a vital portion of a facility with electrical power, management may face the choice between an extremely expensive facility being shut down or continuing to operate in a potentially unsafe condition, with the possibility of catastrophic results should the circuit interrupter be commanded to perform.

Figure 2:
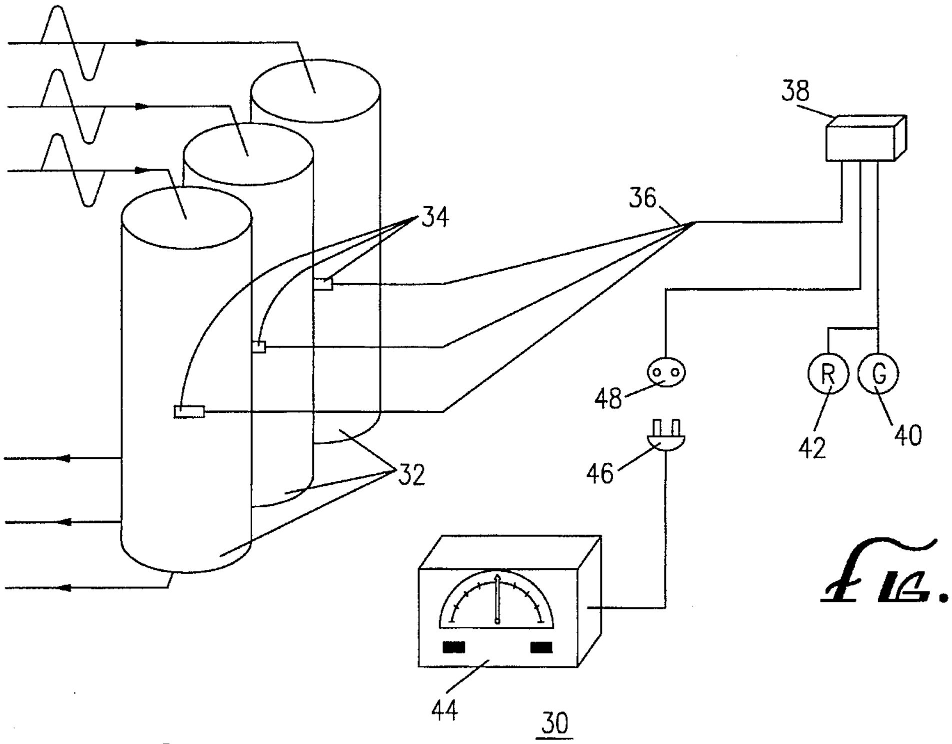
FIG. 2 is a diagram of a preferred embodiment of a nonintrusive pressure vessel monitoring system according to the present invention.

FIG. 2 is a diagram of the preferred embodiment of the nonintrusive pressure monitoring system 30 of the present invention. A circuit interrupter pressure vessel or bottle 32 contains pressurized dielectric gas, typically sulfur hexafluoride ($SF_6$). A dimension sensitive transducer 34 is affixed to the exterior of the vessel and, as the shape of the bottle changes with variations in the differential pressure between the exterior and interior of the bottle 32, the changes in electrical resistance of the dimension sensitive transducer 34 are detected, reflecting a change in internal pressure. Ideally, the transducer 34 should be placed about midway between the top and the bottom of the vessel 32 where changes in pressure will cause the greatest dimensional changes.

The dimension sensitive transducer signals are applied, through lines 36, to signal conditioner electronics 38. These electronics 38 monitor the signals from the dimension sensitive transducer 34 and, when sufficient pressure exists inside the interrupter pressure vessel 32 to allow the protected circuits to be safely interrupted, a green light 40 is illuminated. When pressure within the bottle 32 falls below a predetermined value, a second or red light 42 is illuminated. Each light circuit could be complemented by simultaneous relay contact closure for a remote status indicator.

A portable analog pressure readout device 44 may be connected to the signal conditioner electronics 38 through a plug 46 and socket 48, This allows further, precision, analog level monitoring of the pressure in the bottle 32 so that in the event of a leak, if safe to do so, repairs can be scheduled for the most economical time available without jeopardizing facility safety. If the low pressure condition is caused by a slow leak, it is even possible that the slow leak may stop, permitting a delay in repairs until the facility is shut down for regular maintenance. In the case of a nuclear plant, the shut down might be scheduled to coincide with normal refueling.

Generally, the dimension sensitive transducer 34 is a strain gauge. Ideally, this strain gauge 34 should be chosen so that it is temperature compensated with respect to the surface on which it mounts; in this case, the glass epoxy bottle 32. It is believed that at this time, the optimum dimension sensitive transducer for this purpose has not yet been determined. Strain gauges with their resistance centered at 350 ohms, however, seem to be satisfactory in an experimental configuration. The system requires low voltage AC or DC power in order to run. This is generally available in a power facility.

Due to the extreme amount of electrical noise in a power facility and the need to electrically isolate high voltage for personnel and equipment safety, it may be desirable to use a dimension sensitive transducer which operates on optical principles. Two promising candidates of this type are fiber optic dimension measurement devices and laser based devices. Although, at this time there has not been a complete census of devices which could be applicable to this problem, any dimension sensitive transducer used in the manner described here fits within the scope of this invention.

Figure 3:
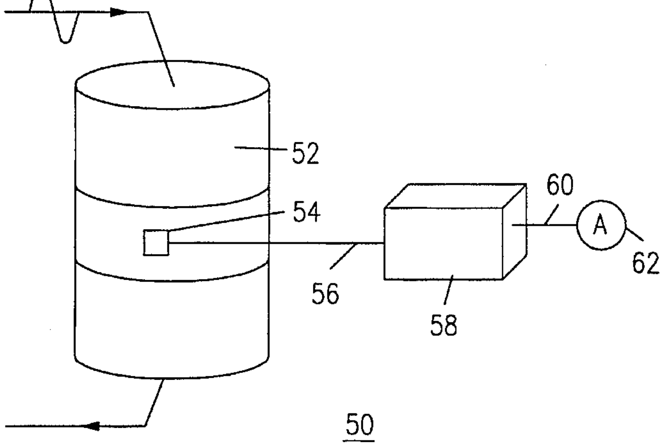
FIG. 3 is a diagram of an alternative embodiment of a nonintrusive pressure vessel monitoring system according to the present invention.

FIG. 3 shows an alternative embodiment 50 of the present invention wherein a transducer 54 is used to measure the pressure indicative of the deformation of a pressure bottle 52, in the shape of an upright cylinder which has been evacuated to a vacuum. The dimension sensitive transducer 54 conveys its measurements over signal output line 56 to signal conditioner electronics 58, which monitor the dimension sensitive transducer 54 measurements to determine if a significant change has occurred.

If there is a change in dimension sensitive transducer 54 measurements sufficient to indicate that the vacuum has been breached, a signal is sent over an indicator line 60 to activate an alarm 62. This alarm may be audible or visible or both. Because even a small leak in a vacuum bottle, leading to a comparatively slight contamination by air molecules, may cause a catastrophic failure in a circuit interrupter pressure vessel 52, any transducer 54 measurements which are indicative of a leak will activate the alarm 62. As in the preferred embodiment, pressure readout and display devices can be used to determine the magnitude of the vacuum within the vessel for management purposes.

In summary, whether a pressure vessel is at a high pressure or evacuated to a vacuum, a nonintrusive system for monitoring the pressure inside the vessel provides valuable information to the facility personnel without adding a potential leak source to the vessel.

For a high pressure vessel there is the added benefit of more precise pressure information from the analog display than would otherwise be available. This may aid greatly in the scheduling of repairs and may even allow the facility manager to postpone maintenance until a scheduled facility shutdown, potentially saving a great deal of money.

For a vacuum vessel, any breach in the vacuum will necessitate immediate repairs. But the failure information provided by a dimension sensitive transducer represents a great advantage over current systems that have no pressure indication at all. Although failure rates of vacuum vessels are very low, any failure in a power facility could be not only very expensive, but also quite dangerous.

Those skilled in the art may devise variations or modifications within the scope of the present invention. Accordingly, the breadth of the invention should be limited only by the claims appended hereto.

What I claim is:

1. A system for monitoring and signaling the pressure inside a circuit interrupter pressure vessel, said system including:

a pressure vessel having a circuit interrupter contained therein;

a transducer sensitive to a change in a physical dimension of said pressure vessel and coupled to the exterior thereof and responsive to distortions in the shape of said vessel representative of changes in relative pressure between the interior of said vessel and the environment exterior to said vessel to provide signals corresponding to and representative of interior pressure; and means for applying electrical power to said transducer to generate output electrical signals indicative of dimensional changes in the pressure vessel exterior corresponding to pressure changes within the said vessel;

a display device electrically connected to said dimension sensitive transducer for providing, in response to said signals, a display representative of vessel distortion in a predetermined format, indicative of the pressure differential existing between the inside of said vessel and the exterior atmosphere being outside of preset limits.

2. The system of claim 1 wherein the pressure vessel contains dielectric gas under high pressure and a high current carrying electrical circuit interrupter.

3. The system of claim 1 wherein the said pressure vessel has been evacuated to a vacuum.

4. The system of claim 1 wherein the said vessel further includes a top, a bottom and a middle section intermediate said top and said bottom, and wherein said dimension sensitive transducer is placed at said middle section of the vessel.

5. The system of claim 1 wherein said display device includes at least one light for signalling an interior pressure above a predetermined minimum acceptable value, said predetermined format including only a representation of whether or not the interior pressure was greater than the acceptable value.

6. The system of claim 1 wherein said display device includes at least one light for signalling an interior pressure below a predetermined minimum acceptable value, said predetermined format including only a representation of whether or not the interior pressure was less than the acceptable value.

7. The system of claim 1 further including signal conditioning electronics for converting dimension sensitive transducer signals to actual measurements of pressure vessel internal pressure values.

8. The system of claim 7 further including an electrical port and a display device adapted to be electrically connected to said signal conditioning electronics to display actual interior pressure measurement values.

9. A method for measuring the pressure inside a circuit interrupter vessel the said method including the steps of:

attaching at least one transducer sensitive to a change in a physical dimension of the exterior of the circuit interrupter vessel and coupled to the exterior thereof to signal deformation of the vessel resulting from changes in relative pressure between the interior and exterior of the vessel;

applying electrical power to said transducer to generate output electrical signals indicative of dimensional changes in the pressure vessel exterior corresponding to pressure changes within the said vessel;

monitoring said output electrical signals over time;

comparing the pressure measurements signalled by said transducer to predetermined pressure magnitude levels; and generating a first alarm signal when the transducer signals a measurement equal to a first predetermined pressure magnitude level.

10. The method of claim 9 further including the additional step of generating a second alarm signal when the transducer measurement signalled is equal to a second predetermined pressure magnitude level.

11. The method of claim 9 wherein the measurements signalled by said transducer are monitored to verify that the pressure within the vessel is maintained within predetermined limits.

12. The method of claim 9 including the further step of monitoring said transducer signals after the pressure in the vessel has reached a predetermined magnitude and displaying the signalled pressure measurements representing the actual pressure within the vessel.

* * * * *

UNITED STATES PATENT AND TRADEMARK OFFICE

CERTIFICATE OF CORRECTION

PATENT NO. : 5,537,858

DATED : July 23, 1996

INVENTOR(S) : Donald L. Bauer

It is certified that error appears in the above-indentified patent and that said Letters Patent is hereby corrected as shown below:

In the Abstract: Item [57]

Line 1, Before "sensitive" insert -- transducer --;

Line 2, After "pressure" insert -- (or vacuum) --;

Line 2, After "vessel", cancel "transducer and" and insert -- is --;

Line 3, After "thereof", cancel "the" and insert --. The -- .

Signed and Sealed this

Twelfth Day of November, 1996

Attest:

Bruce Lehman

BRUCE LEHMAN

*Attesting Officer*

*Commissioner of Patents and Trademarks*